UNITED STATES PATENT OFFICE.

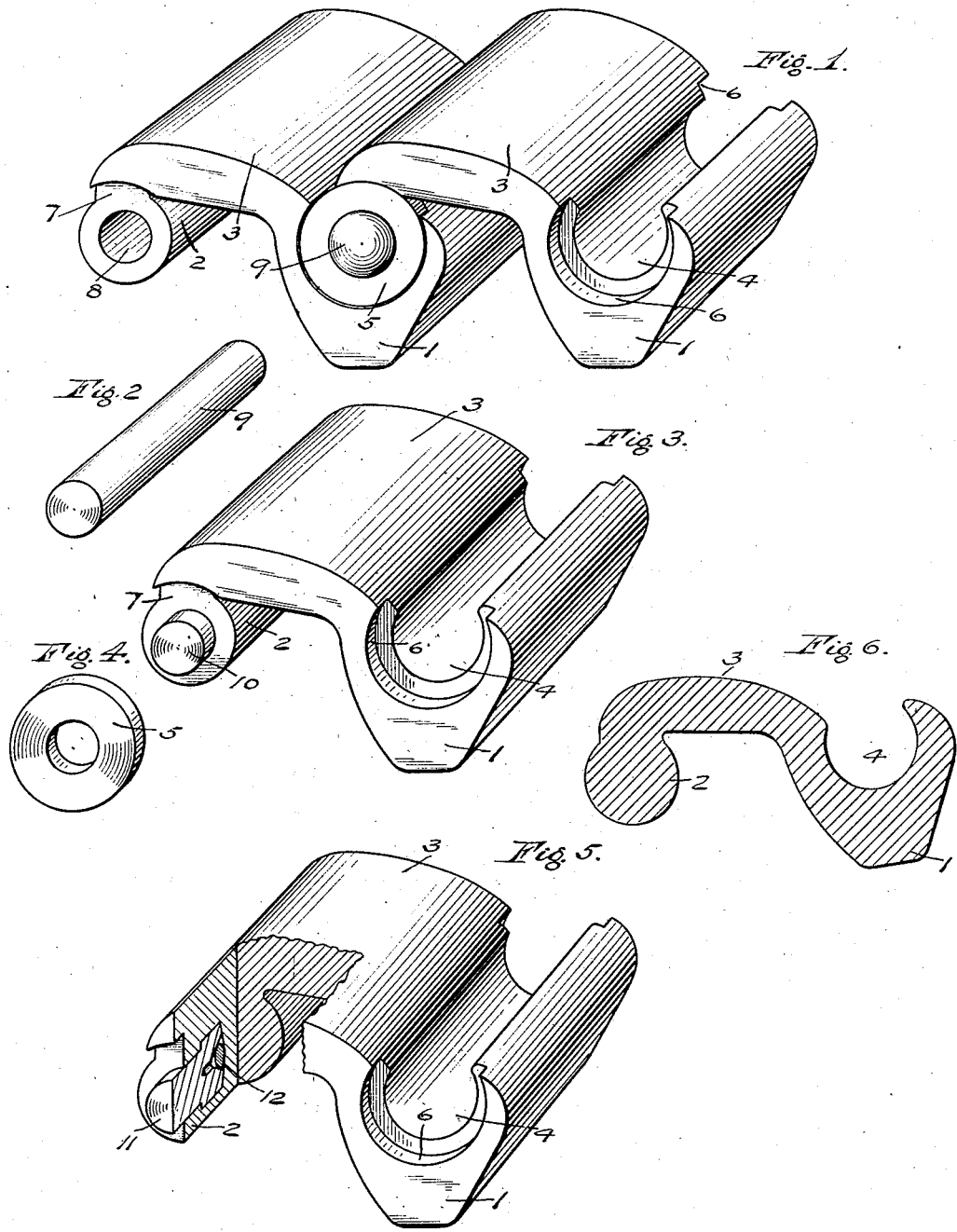

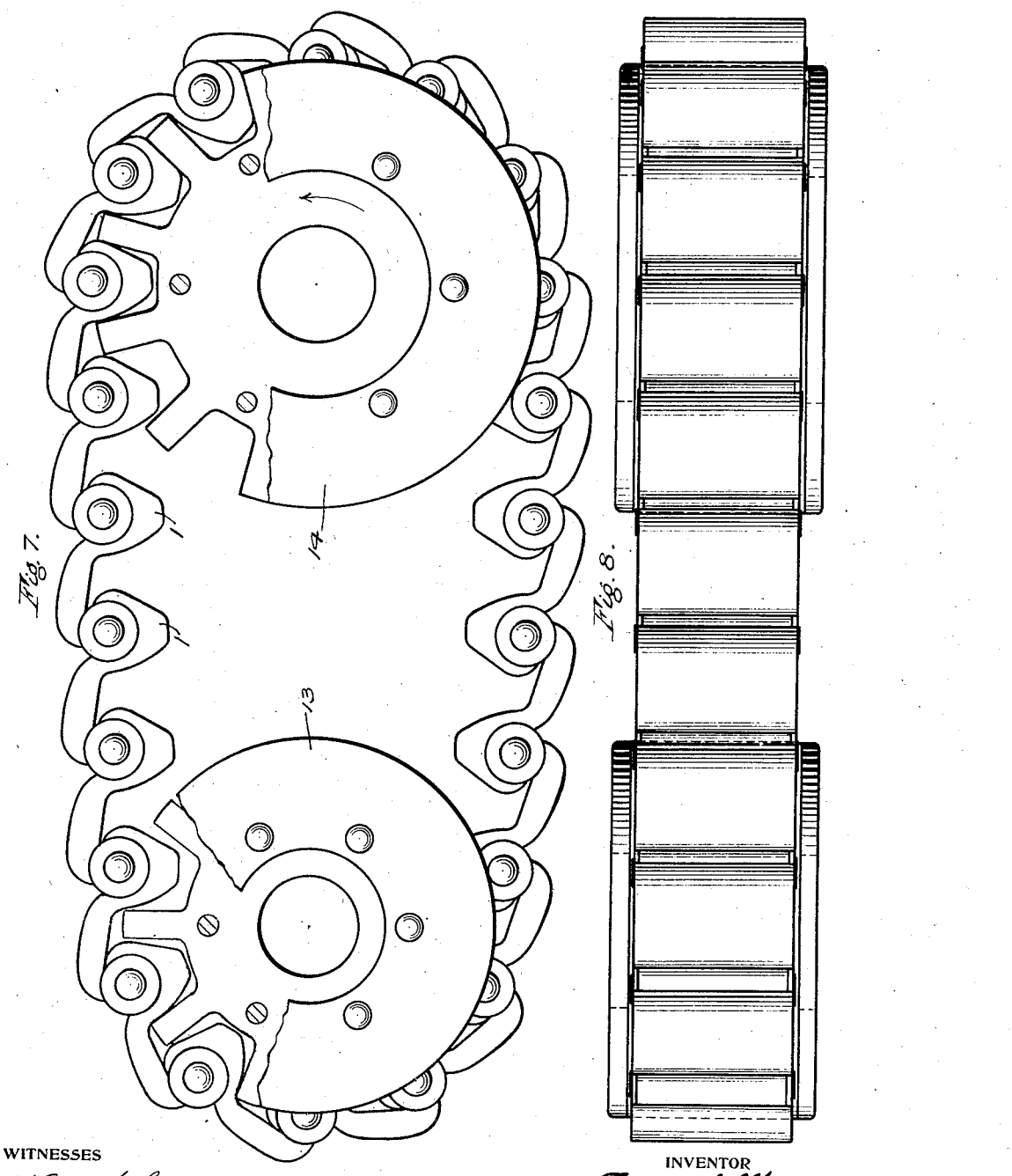

FRANK L. MORSE, OF ITHACA, NEW YORK, ASSIGNOR TO MORSE CHAIN COMPANY, OF ITHACA, NEW YORK, A CORPORATION OF NEW YORK.

DRIVE-CHAIN.

1,120,961.      Specification of Letters Patent.      Patented Dec. 15, 1914.

Application filed January 28, 1910. Serial No. 540,654.

*To all whom it may concern:*

Be it known that I, FRANK L. MORSE, a citizen of the United States, residing at Ithaca, in the county of Tompkins and State of New York, have invented a new and useful Improvement in Drive-Chains, of which the following is a specification.

This invention relates to drive chains, and more particularly to a chain constructed of solid links.

One of the objects of my invention is to provide an improved chain link for drive chains of the above character, which is simple in construction and is adapted to be cheaply manufactured, and for this purpose the links are so designed that they may be produced by simply cutting off sections from a rolled bar of a uniform cross section, the links thus formed being assembled by interlocking to make the chain.

Another object of my invention is to provide a drive chain having solid links which are adapted to be interlocked by lateral movement.

Another object of my invention is to provide a drive chain of the above character having links adapted to arch over the teeth of the sprocket wheel and engage the same at one end only.

Still another object is to provide a drive chain having solid links, the links being so constructed as to provide silent heads for engaging straight sided sprocket teeth and thereby produce a silent running drive chain.

Other objects and advantages will be apparent in the following more detailed description of the invention.

In the accompanying drawings; Figure 1 is an insometric projection of two connected links of a drive chain embodying my improvement; Fig. 2 a similar view of the rivet pin for securing the chain links together; Fig. 3 a similar view of a slightly modified construction of chain link embodying my invention; Fig. 4 a similar view of one of the washers employed in connection with the drive chain; Fig. 5 a similar view of another modified construction of chain link; Fig. 6 a transverse section of a bar from which the improved chain links are cut; Fig. 7 a side view of two sprocket wheels carrying a drive chain constructed in accordance with my invention; and Fig. 8 a plan view thereof.

In carrying out my invention, the chain link is constructed preferably as shown in the drawings with a head 1, adapted to engage the teeth of the sprocket wheel, and a pintle portion 2 rigidly or integrally connected to the head 1 by an arched over portion 3, the head portion 1 having a transverse socket 4 adapted to form a bearing for the pintle portion 2.

The head 1 is preferably of the silent type adapted to engage straight sided teeth of a sprocket wheel so as to compensate for wear and produce the so-called silent running chain, but it should be understood that the invention is not limited to this type of drive chain, as it will be evident that certain features may be employed in connection with various other types of drive chain. Though the links could be cast or formed by forging, I preferably employ rolled bars of the cross-section shown in Fig. 6, which may be formed by first rolling hot to the approximate shape and then cold drawing to the exact finished section. The links are then made from the bar by cutting off sections the necessary width to form a link.

At the opposite ends of the pintle bearing or socket 4, the links are countersunk to provide recesses 6 for washers 5, and similarly, the opposite ends of the pintle portion 2 are countersunk to form recesses 7 for the washers 5.

In order to secure the links together, the pintle portion 2 may be drilled through to form a hole 8 for a rivet pin 9, as shown in Fig. 1. The links are assembled and interlocked by laterally sliding the pintle portion 2 of one link into the bearing 4 of another link, a rivet pin 9 being inserted in the hole 8; a washer 5 is then slipped over the opposite projecting ends of the pin 9 and the ends of the rivet pin are then riveted over, as shown in Fig. 1, thus securely fastening the links together. In the link shown in Fig. 3, the rivet pin is made integral with the link, being formed by leaving the projecting end 10 in the operation of countersinking for the washer.

Still another method of riveting is shown in Fig. 5, in which holes are drilled in the opposite ends of the pintle portion, the inner end of the hole being of larger diameter than the outer end, and short rivet pins 11 each having a cone shaped recess at the inner end, are inserted in said holes. These rivet pins are then secured in place by inserting a steel ball 12, in the recess, and driving the pin 11, against the ball. The pin is thus upset, so as to fill the enlarged inner end of the hole, as shown, and is thereby secured in position. If desired, the upsetting may be done at one operation with the riveting at the outer end of the pin, thus providing a simple and cheap method for fastening the links together.

It will now be apparent that by the employment of the above described form of drive chain link, a simple and cheaply manufactured drive chain may be produced.

Having now described my invention, what I claim as new and desire to secure by Letters Patent, is:—

1. A drive chain comprising solid integral links of uniform longitudinal section adapted to pass around and arch over the teeth of driving and driven sprocket wheels, each link having a pintle portion at one end and a socket at the opposite end, and a projecting head at the socket end for engaging the teeth of the sprocket wheels.

2. A drive chain comprising solid integral links of uniform longitudinal section adapted to pass around and arch over the teeth of driving and driven sprocket wheels, each link having a cylindrical pintle portion at one end and a corresponding socket at the opposite end, and a projecting head at the socket end provided with bearing faces for engaging the teeth of the respective sprocket wheels.

3. A drive chain comprising solid integral links of uniform longitudinal section adapted to pass around and arch over the teeth of driving and driven sprocket wheels, each link having a pintle portion at one end and a socket at the opposite end, fastening means mounted on the pintle portion for preventing lateral separation of the links, and a projecting head having opposite bearing faces for engaging the teeth of the sprocket wheels.

4. A drive chain comprising links each formed in one integral piece of uniform longitudinal section and having a pintle portion at one end and a projecting head formed with a pintle socket at the other end, said head being provided with bearing faces for engaging the teeth of the sprocket wheels, and washers mounted at the ends of the pintle for preventing lateral separation of the links.

5. A drive chain comprising links each formed in one integral piece of uniform longitudinal section and having a substantially cylindrical pintle portion at one end and a projecting head formed with a corresponding cylindrical pintle socket at the other end, said head being provided with bearing faces for engaging the teeth of the sprocket wheels, projecting pins secured in the opposite ends of the pintle portion, and washers mounted on said pins for preventing lateral separation of the links.

In testimony whereof I have hereunto set my hand.

FRANK L. MORSE.

Witnesses:
ALFRED B. WRAY,
V. D. MORSE.